United States Patent [19]
Yada et al.

[11] Patent Number: 5,174,624
[45] Date of Patent: Dec. 29, 1992

[54] MOLDING FOR USE WITH AN AUTOMOBILE AND PROCESS FOR MANUFACTURING THE SAME

[75] Inventors: Yukihiko Yada, Nagoya; Katuaki Nagai, Chita, both of Japan

[73] Assignee: Tokai Kogyo Kabushiki Kaisha, Obu, Japan

[21] Appl. No.: 829,406

[22] Filed: Feb. 3, 1992

[30] Foreign Application Priority Data

Feb. 7, 1991 [JP] Japan .................................... 3-39214
Nov. 21, 1991 [JP] Japan .................................. 3-334346

[51] Int. Cl.⁵ .............................................. B60R 13/06
[52] U.S. Cl. ...................................................... 296/93
[58] Field of Search ....................... 296/93, 201; 52/208

[56] References Cited

U.S. PATENT DOCUMENTS

| | | | |
|---|---|---|---|
| 4,984,839 | 1/1991 | Miyakawa et al. | 296/93 |
| 5,035,459 | 7/1991 | Yada | 296/93 |
| 5,039,157 | 8/1991 | Yada | 296/93 |
| 5,044,684 | 9/1991 | Yada | 296/93 |
| 5,094,498 | 3/1992 | Yada | 296/93 |

FOREIGN PATENT DOCUMENTS 63-212121 9/1988 Japan .

Primary Examiner—Robert R. Song
Attorney, Agent, or Firm—Dennison, Meserole, Pollack & Scheiner

[57] ABSTRACT

A molding including a molding body having a leg portion and a covering portion integrally provided on and extending along an upper side of the leg portion. The molding body is provided with a weir member longitudinally fitted along a desired section thereof. The molding body is formed with a groove which extends along only the desired section of said molding body. The groove may be formed on the leg portion and the covering portion. The molding is manufactured by extruding a molding material from a molding opening having a desired configuration. The groove is formed by selectively projecting a grooving tool into the molding opening during extruding the molding material from the molding opening.

9 Claims, 14 Drawing Sheets

MOLDING FOR USE WITH AN AUTOMOBILE AND PROCESS FOR MANUFACTURING THE SAME

BACKGROUND OF THE INVENTION

The present invention relates to a molding for use with an automobile and a process for manufacturing the same.

The conventional molding for use with an automobile generally comprises a molding body and a pair of weir members. The molding body has a leg portion to be installed into a clearance between the circumferential edge of the windshield and the automobile body, and a covering portion which comprises an outer covering portion contactable with the automobile body and an inner covering portion contactable with the windshield. Each of the weir members is mounted on the lower surface of the inner covering portion of the molding body so as to extend along each of front pillars of the automobile body.

The molding is installed in the clearance between the circumferential edge of the windshield and the automobile body. At the molding body adjacent to a roof panel of the automobile body, the peripheral edge of the inner covering portion is closely seated on the outside surface of the windshield. At the molding body adjacent to the front pillar, the weir member is closely seated on the outside surface of the windshield, thereby to form a guide groove along the front pillar of the automobile. The guide groove may act as a leading groove to effectively lead the rainwater or the like therealong.

Such a conventional molding is found, for example, in Japanese Laid-Open Patent Publication No. 63-212121.

As shown in FIGS. 19 to 21, in the molding disclosed in Japanese Publication No. 63-212121, the lower surface of the inner covering portion 513 of the molding body 511 is formed with a thin groove 515 and the weir member 522 is longitudinally formed with a lip portion 522a. The weir member 522 is mounted on the lower surface of the inner covering portion 513 by engaging the lip portion 522a with the thin groove 515. Further, the lip portion 522a generally has a width greater than that of the thin groove 515 so that the peripheral edge 513a of the inner covering portion 513 is lifted up when the lip portion 522a is engaged with the thin groove 515.

A problem usually associated with the prior art molding as described in Japanese Publication No. 63-212121 is that as best shown in FIG. 19, the thin groove 515 extends throughout the entire length of the molding body 511. Therefore, when the molding is installed in the clearance between the circumferential edge of the windshield 515 and the automobile body 501, with the molding body 511 bent along an arcuate portion C5 of the automobile body 501, the inner covering portion 513 is partly floated or wrinkled at the bent portion of the molding body 511, thereby to form a clearance between the inner covering portion 513 of the molding body 511 and the outer surface of the windshield 505 at the bent portion of the molding body 511. This may cause entry of rainwater into the clearance between the circumferential edge of the windshield 515 and the automobile body 501. This may also lead to undesirable awkward appearance of the molding body.

As will be appreciated, compressive stress will be produced when the molding body 511 is bent along the arcuate portion C5 of the automobile body 501. Such compressive stress is concentrated on the thin groove 515 of the inner covering portion 513 at the bent portion of the molding body 511, thereby causing the floating or wrinkling of the inner covering portion 513 at the bent portion of the molding body 511.

SUMMARY OF THE INVENTION

It is an object of the invention to provide an improved molding for use with an automobile, that is, to provide a molding which may effectively prevent the floating or wrinkling of the inner covering portion at a bent portion of the molding body.

It is another object of the invention to provide a process suitable for manufacturing the molding.

A molding of the present invention includes a molding body having a leg portion and a covering portion integrally provided on and extending along an upper side of the leg portion, and a weir member longitudinally fitted along a desired section of the molding body. The weir member has a weir portion and an engagement projection which is integrally formed with the weir portion and which extends over the entire length thereof. The covering portion of the molding body is formed with a groove which extends along only the desired section of the molding body and with which the engagement projection of the weir member is engaged. At a section of the molding body along which the weir member is not fitted, the peripheral edge of the covering portion is seated on the outside surface of the windshield when the molding is positioned along the windshield. At the section of the molding body along which the weir member is fitted, the peripheral edge of the covering portion is spaced from the outside surface of the windshield to seat the lower edge of the weir portion of the weir member on the outside surface of the windshield when the molding is positioned along the windshield.

A molding of the present invention includes a molding body having a leg portion and a covering portion integrally provided on and extending along an upper side of the leg portion, and a weir member longitudinally fitted along a desired section of the molding body. The leg portion of the molding body is formed with a groove which extends along only the desired section of the molding body. At a section of the molding body along which the weir member is not fitted, the peripheral edge of the covering portion is seated on the outside surface of the windshield when the molding is positioned along the windshield. At the section of the molding body along which the weir member is fitted, the leg portion is bent along the groove to space the peripheral edge of the covering portion from the outside surface of the windshield and the seat the lower edge of the weir member on the outside surface of the windshield when the molding is positioned along the windshield.

A process of the present invention includes the steps of providing a molding die having a molding opening of which the configuration is configured to conform to the sectional configuration of a second section of a molding body, providing a grooving member arranged so as to be projected into and withdrawn from the molding opening, extruding a molding material from the molding opening of the molding die to form a first section of the molding body over a desired length, with the grooving member projected, and extruding a molding material from the molding opening of the molding die to form the second section of the molding body over a desired length, with the grooving member withdrawn. The steps of forming the first and second sections of the molding body are continuously performed.

An important feature of the present invention is that since the thin groove is not extended to the bent portion of the molding body, stress concentration is effectively prevented at the bent portion of the molding body, thereby offering the advantage that the inner covering portion is not floated or wrinkled at the bent portion of the molding body.

Another feature of the present invention is that since the inner covering portion is not floated or wrinkled at the bent portion of the molding body, the molding body exhibits a good appearance.

The present invention will become more fully apparent from the claims and the description as it proceeds in connection with the drawings.

DETAILED DESCRIPTION OF THE PREFERRED EMBODIMENT

Figure 1:
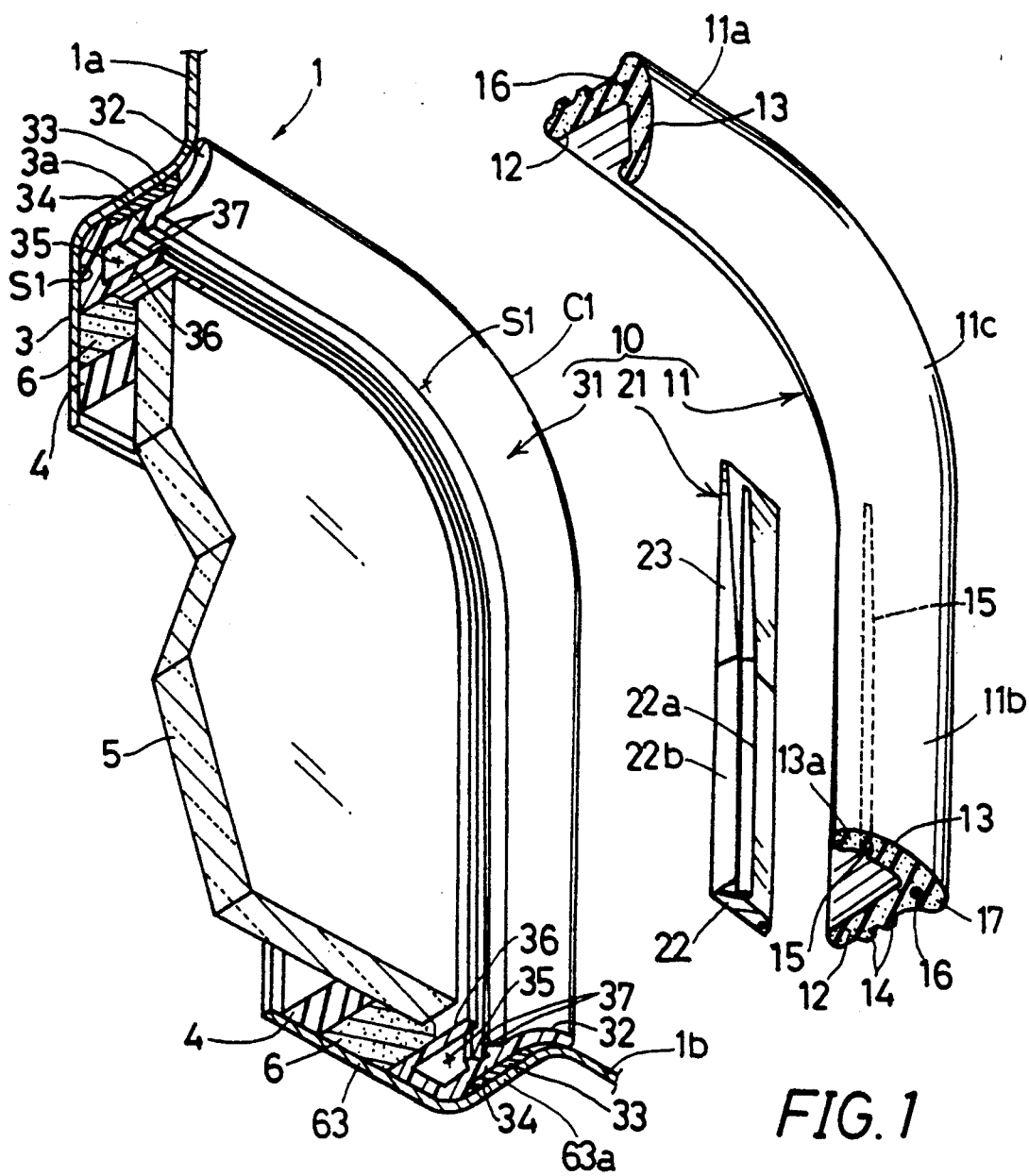
FIG. 1 is a perspective view of a molding according to a first embodiment of the present invention and an automobile body to which the molding is installed.
Figure 2:
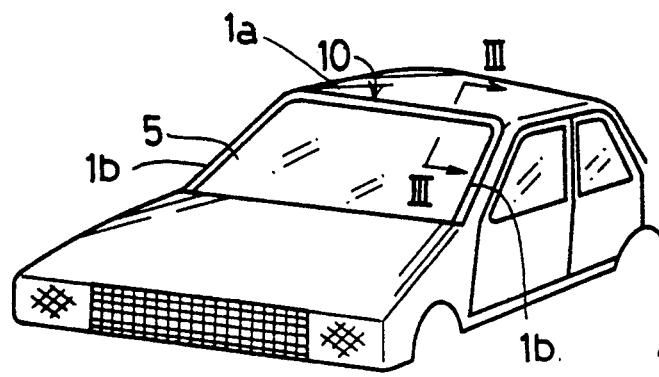
FIG. 2 is a schematic illustration of an automobile showing several portions mounting the molding.
Figure 3:
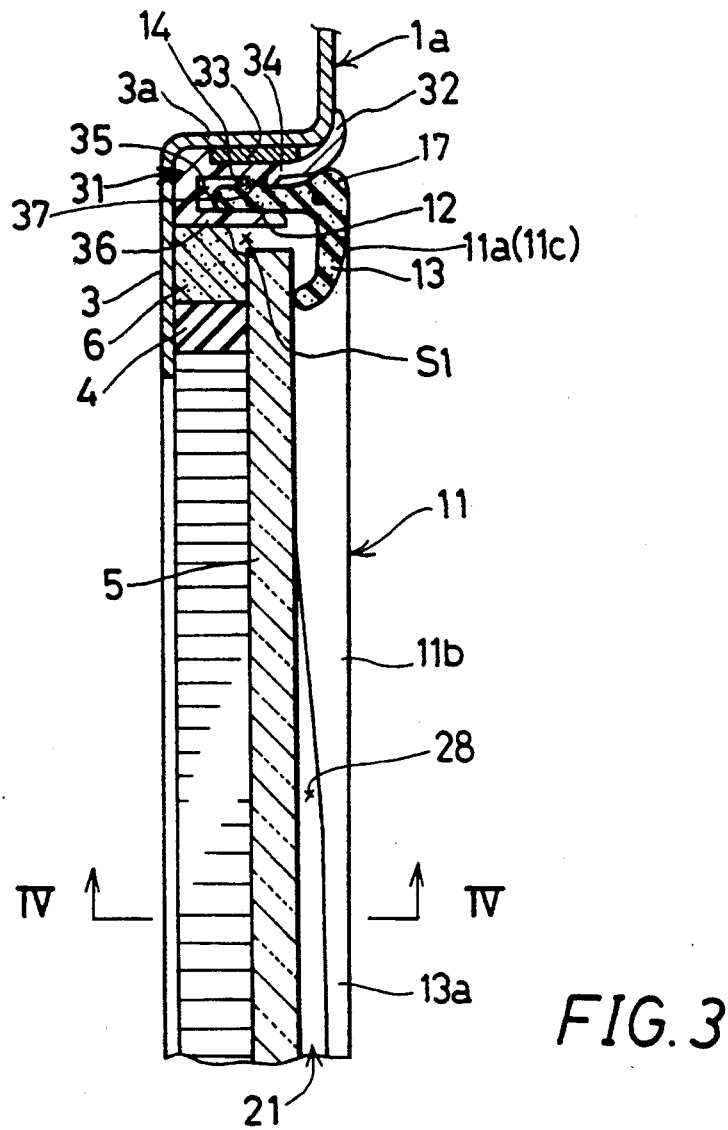
FIG. 3 is a sectional view taken along the line III—III of FIG. 2.
Figure 4:
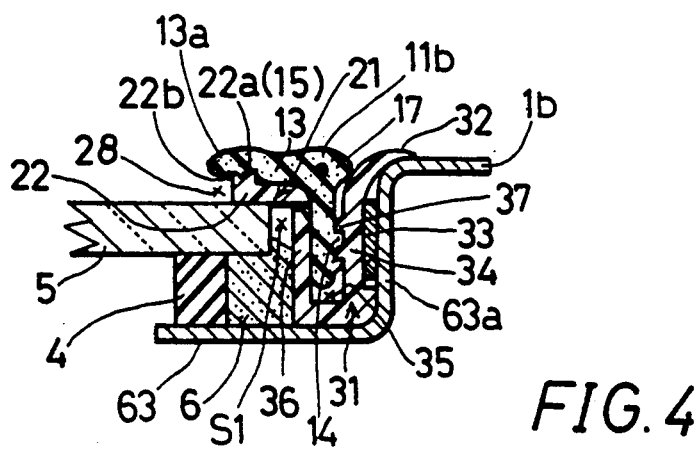
FIG. 4 is a sectional view taken along the line IV—IV of FIG. 3.

Referring now to FIGS. 1, 3 and 4, shown therein is a molding according to a first embodiment of the invention. Referring to FIG. 2, a front windshield 5 is provided on a body 1 of an automobile. The windshield 5 is effectively supported on a roof panel 1a of the automobile body 1 and on front pillars 1b integrally formed with the roof panel 1a. A molding 10 is installed in a clearance S1 (shown in FIGS. 1, 3 and 4) between the edge surface of the windshield 5 and the automobile body 1.

As shown in FIG. 1, the roof panel 1a and the front pillars 1b (only one of which is shown) are interconnected to form arcuate portion C1 (only one of which is shown) therebetween. The peripheral edge of the roof panel 1a is inwardly folded to form a slanted wall portion 3a and a flanged portion 3. The peripheral edge of each front pillar 1b is also inwardly folded to form a slanted wall portion 63a and a flanged portion 63 which are integral with the wall portion 3a and the flanged portion 3, respectively.

The windshield 5 is circumferentially provided with a dam member 4 formed of a rubber or the like and is bonded to the flanged portions 3, 63 with an adhesive 6.

The molding 10 comprises a molding body 11 and a weir member 21. The molding 10 further includes a fastener 31 to fixedly support the same on the automobile body 1.

The molding body 11 is formed of resilient material such as rubber and synthetic resin. The molding body 11 has a substantially T-shaped cross-sectional configuration and includes a first molding section 11a which is positioned along the roof panel 1a, second molding section 11b (one of which is shown) which are positioned along the front pillars 1b, and third molding section 11c (one of which is shown) which are positioned along the arcuate portion C1. The molding body 11 comprises a leg portion 12, an inner covering portion 13 and an outer covering portion 17. The inner and outer covering portions 13, 17 are integrally formed with the leg portion 12. The leg portion 12 is formed longitudinally with a pair of engagement projections 14 outwardly projecting and extending throughout the overall length of the molding body 11. The lower surface of the inner covering portion 13 is formed with thin grooves 15 (one of which is shown). The thin groove 15 extends along only the second molding section 11b. Further, the molding body 11 is longitudinally embedded with a reinforcing bar 16 to prevent expansion and contraction thereof.

The weir members 21 (one of which is shown) are formed of synthetic resin. Each of the weir members 21 comprises a weir body 22 having a length equal substantially to the second section 11b. The weir body 22 has an engagement projection 22a and a weir surface or a weir portion 22b which extend substantially throughout the overall length thereof. The engagement projection 22a has a width greater than that of the thin groove 15 formed on the inner covering portion 13. Further, as best shown in FIG. 1, the weir body 22 is formed with a slanted portion 23 so that the height of the engagement projection 22a and the weir portion 22b is gradually reduced toward one end of the weir body 22.

As shown in FIG. 4, the weir member 21 as formed above is incorporated in the second molding section 11b of the molding body 11 by forcing the engagement projection 22a of the weir body 22 into the thin groove 15 of the inner covering portion 13. Further, the weir member 21 is arranged so that the slanted portion 23 is positioned adjacent to the third molding section 11c. Since the width of the engagement projection 22a is greater than that of the thin groove 15, the thin groove 15 is expanded to lift up the peripheral edge 13a of the inner covering portion 13 when the engagement projection 22a is completely engaged with the thin groove 15. The weir member 21 is fixed to the lower surface of the inner covering portion 13 with an adhesive (not shown).

The fastener 31 is positioned in the clearance S1 so as to extend over the entire length thereof. The fastener 31 has a substantially U-shaped cross-sectional configuration and is formed of resilient material such as rubber and synthetic resin. The fastener 31 has a first and second walls 34, 36 to form a receiving groove 35 therebetween which is received with the leg portion 12 of the molding body 11. The fastener 31 is secured to the slanted wall portions 3a, 63a of the automobile body 1 by a double sided tape 33 adhered on the outside surface of the first wall 34. The first wall 34 of the fastener 31 is formed with a pair of projection 37 projecting into the groove 35 and extending throughout the overall length thereof. The first wall 34 is also formed with a lip portion 32 outwardly projecting and extending throughout the overall length thereof. The lip portion 32 is adapted to closely seat on the upper surface of the automobile body 1.

The molding body 11 incorporated with the weir member 21 is installed on the automobile body 1 by inserting the leg portion 12 of the molding body 11 into the receiving groove 35 of the fastener 31, with the molding body 11 bent along the arcuate portion C1 of the automobile body 1. When the leg portion 12 is completely inserted into the receiving groove 35, the engagement projection 14 of the leg portion 12 are engaged with the projections 37 of the fastener 31 to effectively secure the molding body 11 on the automobile body 1.

As shown in FIG. 3, at the first and third molding sections 11a, 11c of the molding body 11 which correspond to the roof panel 1a and the arcuate portion C1 and to which the weir member 21 is not fitted, the peripheral edge 13a of the inner covering portion 13 is closely seated on the outside surface of the windshield 5. The outer covering portion 17 is closely seated on the lip portion 32 of the fastener 31.

As shown in FIG. 4, at the second molding section 11b of the molding body 11 which corresponds to the front pillar 1b, the lower surface of the weir body 22 of the weir member 21 is closely seated on the outside surface of the windshield 5, that is, the peripheral edge 13a of the inner covering portion 13 is spaced from the outside surface of the windshield 5. As will be easily understood, the weir portion 22b of the weir body 22 cooperates with the peripheral edge 13a of the inner covering portion 13 and the outside surface of the windshield 5 to form a groove 28 extending along the front pillar 1b. The groove 28 acts as a guide groove to effectively lead rainwater therealong. Further, the outer covering portion 17 is closely seated on the lip portion 32 of the fastener 31.

As described above, when installing the molding body 11 to the automobile body 1, the molding body 11 is bent along the arcuate portion C1 of the automobile body 1. However, since the thin groove 15 of the inner covering portion 13 does not extend to the bent portion of the molding body 11, the compressive stress produced by the distortion of the molding body 11 is dispersed over the bent portion of the molding body 11 to effectively prevent concentration of such compressive stress. Thus, the molding body 11 can be installed to the automobile body 1 without producing the floating or wrinkling of the inner covering portion 13 at the bent portion of the molding body 11. This may lead to a good appearance and an excellent sealing performance of the molding 10.

Referring now to FIGS. 5 to 10, shown therein is a process for manufacturing the molding 10, in particular for manufacturing the molding body 11 of the present invention.

Figure 5:
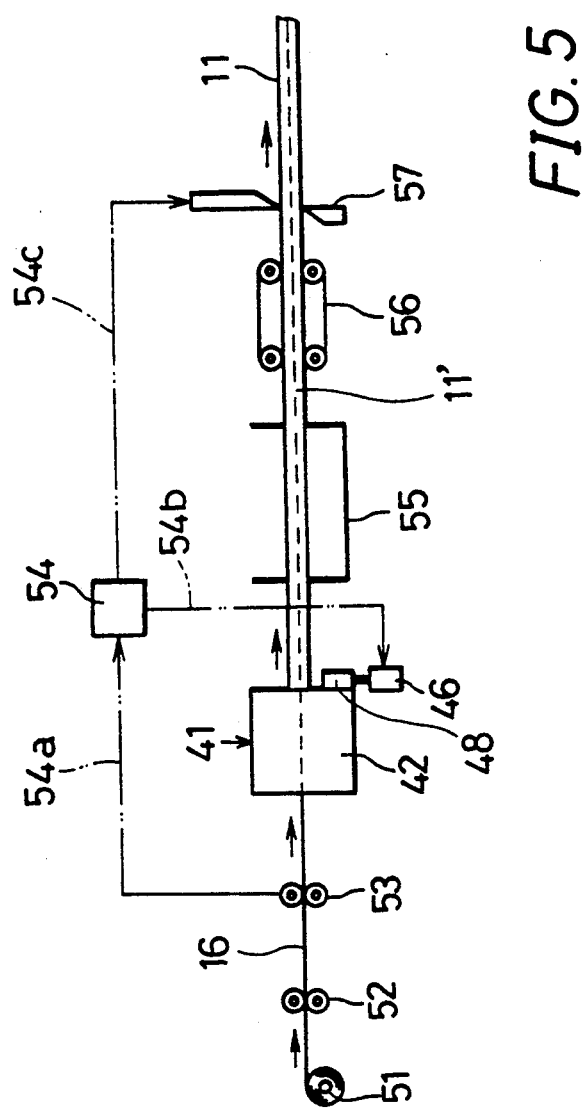
FIG. 5 is a schematic illustration of apparatus for manufacturing a molding body of the molding.
Figure 9:
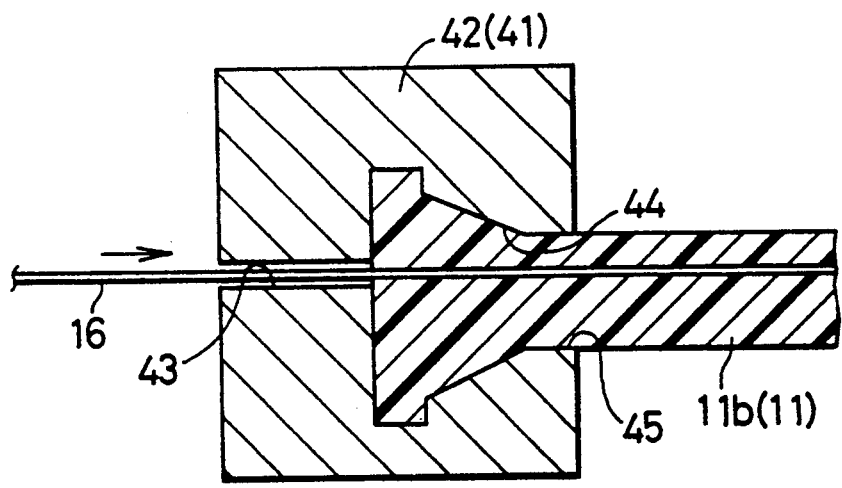
FIG. 9 is a sectional view taken along the line IX—IX of FIG. 8.

The molding body 11 is manufactured by several machines shown in FIG. 5. The reinforcing bar 16 fed from a supply roll 51 passes through forming roller 52 and conveyer rollers 53 before entering a molding die 42 of a molding machine 41. As shown in FIG. 9, the molding die 42 has a passage 43 and a molding material supplying passage 44 communicating with each other. The molding material supplying passage 44 opens to a molding opening 45 which is configured to conform to the sectional configuration of the first and third molding sections 11a, 11c of the molding body 11. The reinforcing bar 16 transferred to the molding die 42 is introduced into the passages 43, 44 and is projected from the molding opening 45 where a molding process is started. In the molding process, a molding material fed through the molding passage 44 is extruded from the molding opening 45 to continuously form a molding product 11' embedded with the reinforcing bar 16.

Figure 6:
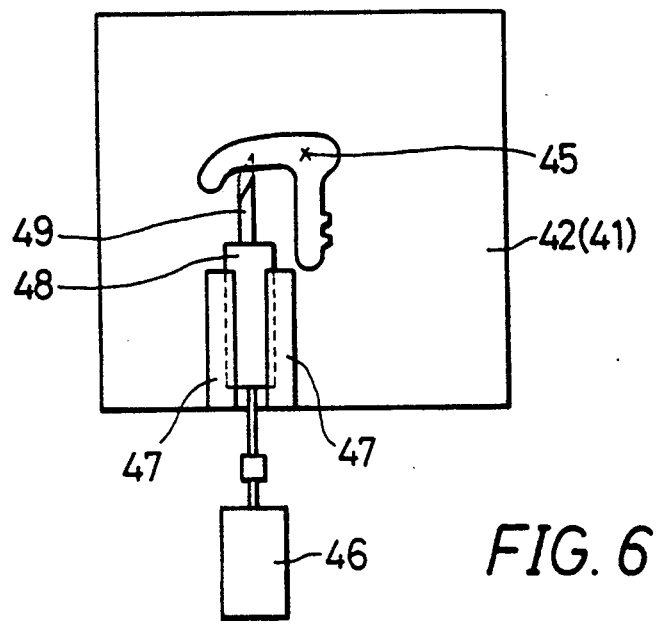
FIG. 6 is an elevational view of a molding die.

The forward end of the molding die 42 is provided with a grooving tool 48 operated by a hydraulic cylinder 46. As shown in FIG. 6, the grooving tool 48 has a grooving blade 49 and is vertically slidably guided by a pair of guide plates 47 mounted on the molding die 42. The grooving tool 48 is adapted to move so that the grooving blade 49 is moved between the uppermost position (shown in a phantom line in FIG. 6) and the lowermost position (shown in a solid line in FIG. 6). The edge portion of the grooving blade 49 has a configuration corresponding to the sectional configuration of the thin groove 15.

Figure 7:
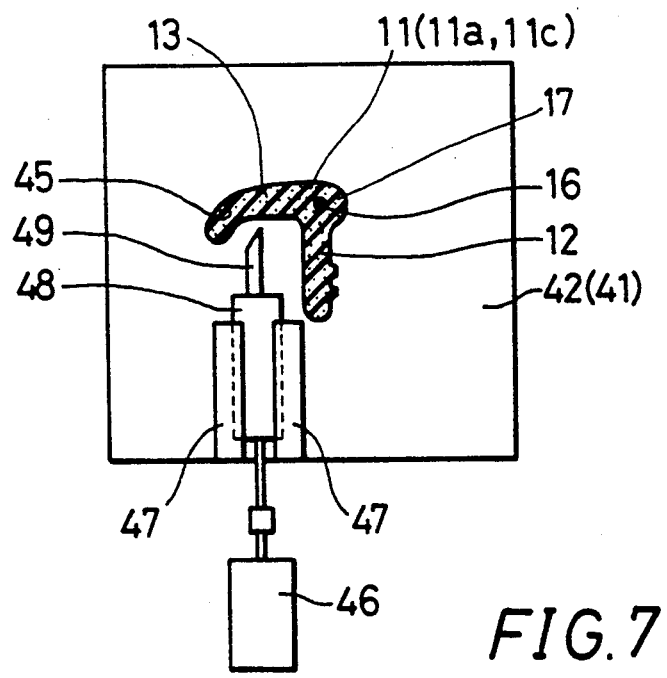
FIG. 7 is an elevational view of the molding die, showing the condition that a grooving tool is downwardly shifted for forming a section of the molding body which corresponds to a roof panel and an arcuate portion of the automobile body.
Figure 8:
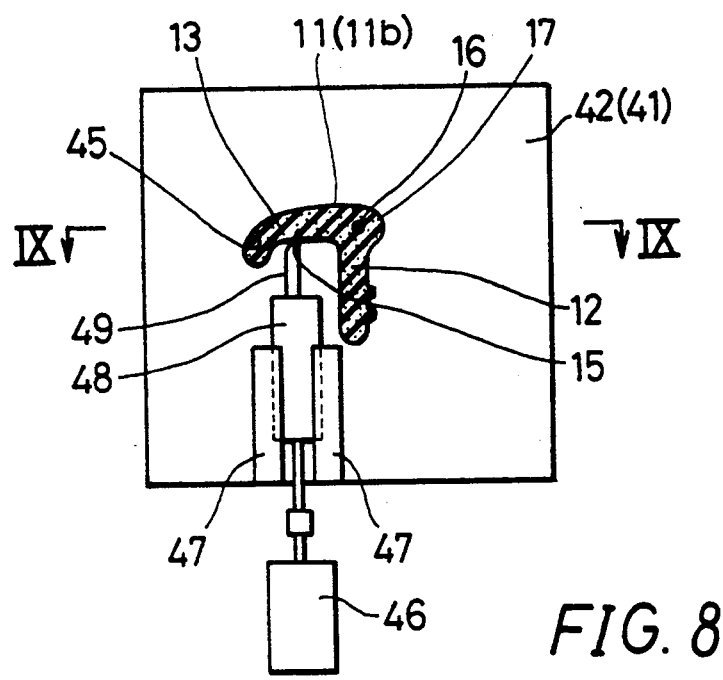
FIG. 8 is an elevational view of the molding die, showing the condition that a grooving tool is upwardly shifted for forming a section of the molding body which corresponds to the front pillar.

When the molding product 11' corresponding to the first and third molding sections 11a, 11c of the molding body 11 is formed, as shown in FIG. 7, the grooving tool 48 is moved so that the grooving blade 49 is shifted to the lowermost position thereof. Further, when the molding product 11' corresponding to the second molding sections 11b of the molding body 11 is formed, as shown in FIG. 8, the grooving tool 48 is moved so that the grooving blade 49 is shifted to the uppermost position thereof, by which the molding product 11' is formed with grooves corresponding to the thin grooves 15.

Figure 10:
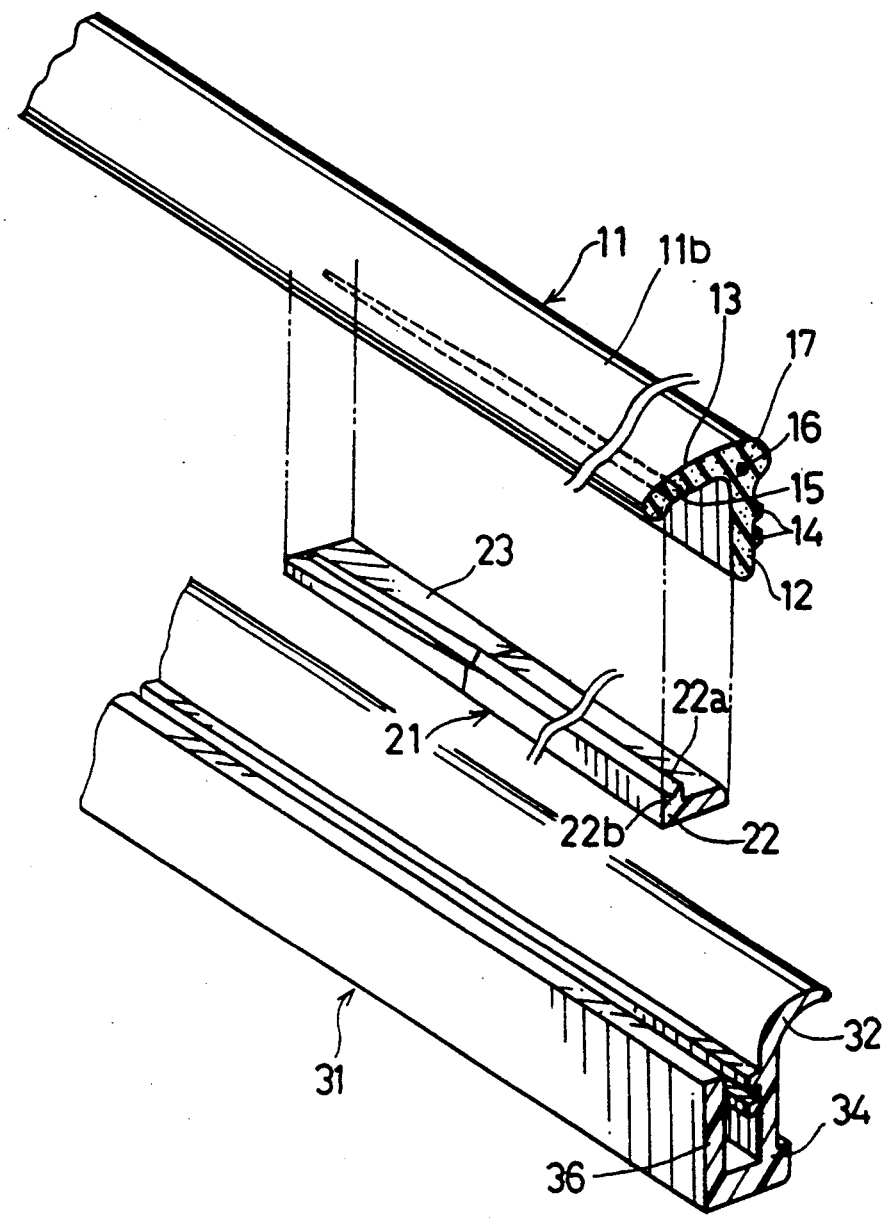
FIG. 10 is an exploded perspective view of the molding before installation to the automobile body.

The molding product 11' thus formed passes through a cooling bath 55 and guide rollers 56 and is finally transferred to a cutting machine 57 where the molding product 11' is cut to a desired length, thereby to form the molding body 11' is cut to a desired length, thereby to form the molding body 11 of rectilinear configuration which comprises the three molding sections 11a, 11b, 11c, as shown in FIG. 10.

As shown in FIG. 5, a control unit 54 is connected to the conveyer rollers 53, the hydraulic cylinder 46 and the cutting machine 47 via cables 54a, 54b, 54c, respectively. The control unit 54 is capable of receiving signals from the conveyer rollers 53 via cable 54a and is capable of transmitting control signals necessary for controlling the hydraulic cylinder 46 and the cutting machine 47 via cables 54b, 54c. Further, these signal receptions and transmissions are accomplished according to well-known techniques. Thus, the hydraulic cylinder 46 and the cutting machine 47 are controllably operated by the signals from the control unit 54, thereby permitting formation of the grooves at desired sections of the molding product 11' and cutting of the molding product 11' at a desired position.

The weir member 21 and the fastener 31 are formed by a conventional molding process. Therefore, the explanation of the forming process of these members 21, 31 will be omitted.

Figure 11:
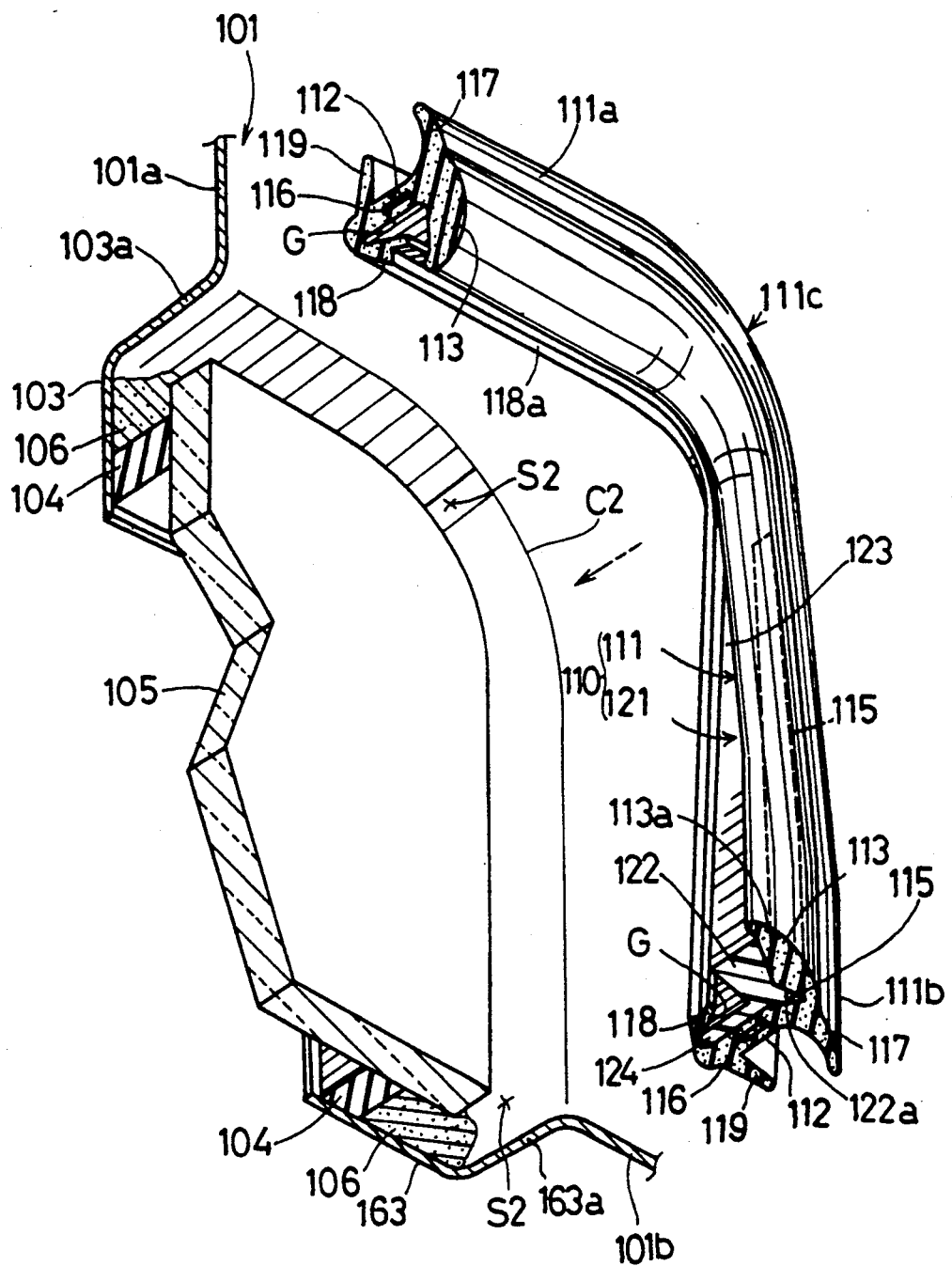
FIG. 11 is a perspective view of a molding according to a second embodiment of the present invention and an automobile body to which the molding is installed.
Figure 12:
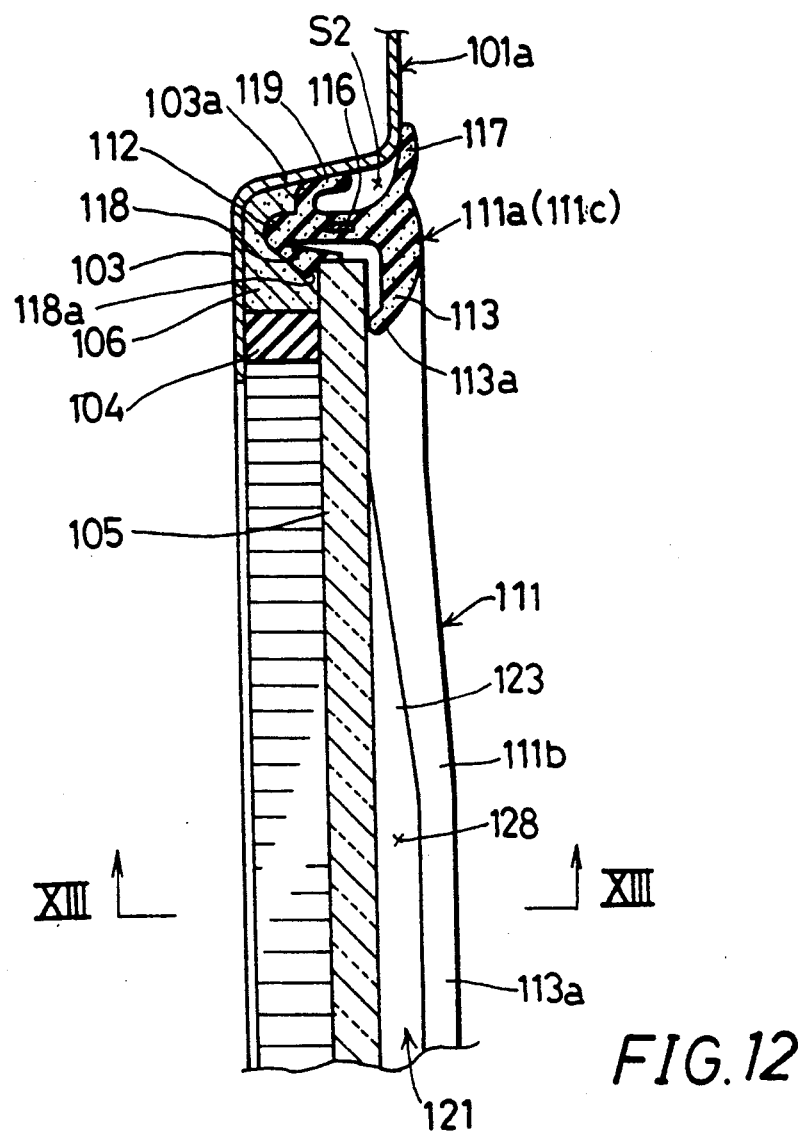
FIG. 12 is a sectional view similar to FIG. 3.
Figure 13:
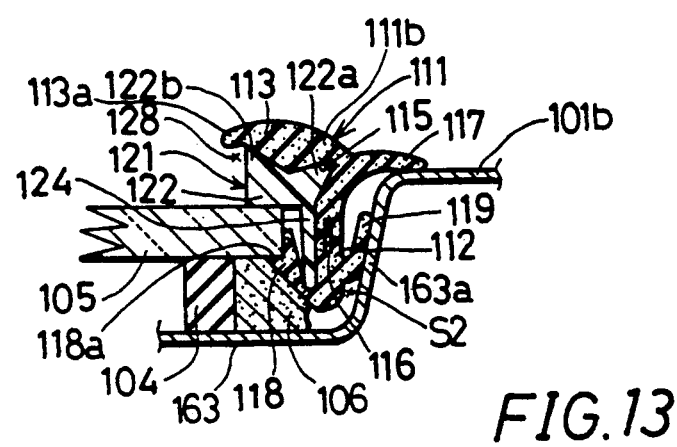
FIG. 13 is a sectional view taken along the line XIII—XIII of FIG. 12.

Referring now to FIGS. 11 to 13, shown therein is a molding 110 according to a second embodiment of the invention.

As shown in FIG. 11, a roof panel 101a and front pillars 101b (one of which is shown) of an automobile body 101 are interconnected to form arcuate portions C2 (one of which is shown) therebetween. The peripheral edge of the roof panel 101a is inwardly folded to form a slanted wall portion 103a and a flanged portion 103. The peripheral edge of each front pillar 101b is also inwardly folded to form a slanted wall portion 163a and a flanged portion 163 which are integral with the wall portion 103a and the flanged portion 103, respectively.

As best shown in FIG. 11, a windshield 105 is circumferentially provided with a dam member 104 formed of a rubber or the like and is bonded to the flanged portions 103, 163 with an adhesive 106. A clearance S2 is formed between the edge surface of the windshield 105 and the automobile body 101.

The molding 110 comprises a molding body 111 and a weir member 121.

The molding body 111 is formed of resilient material such as rubber and synthetic resin. The molding body 111 has a substantially T-shaped cross-sectional configuration and includes a first molding section 111a which is positioned along the roof panel 101a, second molding sections 111b (one of which is shown) which are positioned along the front pillars 101b, and third molding sections 111c (one of which is shown) which are positioned along the arcuate portions C2. The molding body 111 comprises a leg portion 112, which is inserted into the clearance S2, and an inner covering portion 113 and an outer covering portion 117 which are integrally formed with the leg portion 112. The leg portion 112 is integrally formed with an engagement lip 119 outwardly projecting and extending throughout the overall length of the molding body 111. The leg portion 112 is also integrally formed with a lip 118 inwardly projecting and extending throughout the overall length of the molding body 111 in such a way that an engagement groove G is formed between the leg portion 112 and the lip 118. The lip 118 has a shoulder portion 118a extending throughout the overall length thereof. The lower surface of the inner covering portion 113 is formed with thin grooves 115 (one of which is shown). The thin groove 115 extends along only the second molding section 111b. Further, the molding body 111 is longitudinally embedded with a reinforcing bar 116 to prevent expansion and contraction thereof.

The weir members 121 (one of which is shown) are formed of synthetic resin. Each of the weir members 121 comprises a weir body 122 having a length equal substantially to the second section 111b and an extension 124 integrally formed with the weir body 121. The weir body 122 has an engagement projection 122a and a weir portion 122b which extend substantially throughout the overall length thereof. The engagement projection 122a has a width greater than that of the thin groove 115 formed on the inner covering portion 113. Further, the weir body 122 is formed with a slanted portion 123 so that the height of the engagement projection 122a and the weir portion 122b is gradually reduced toward one end of the weir body 122.

As shown in FIG. 11, the weir member 121 as formed above is incorporated in the second molding section 111b of the molding body 111 by forcing the engagement projection 122a of the weir body 122 into the thin groove 115 of the inner covering portion 113 and fitting the extension 124 into the engagement groove G. Further, the weir member 121 is arranged so that the slanted portion 123 is positioned adjacent to the third molding section 111c. Since the width of the engagement projection 122a is greater than that of the thin groove 115, the thin groove 115 is expanded to lift up the peripheral edge 113a of the inner covering portion 113 when the engagement projection 122a is completely engaged with the thin groove 115. The weir member 121 is fixed to the lower surface of the inner covering portion 113 with an adhesive (not shown).

The molding body 111 incorporated with the weir member 121 is installed to the automobile body 101 by inserting the leg portion 112 of the molding body 111 into the clearance S2, with the molding body 111 bent along the arcuate portion C2 of the molding body 101. When the leg portion 112 is completely inserted into the clearance S2, the engagement lip 119 of the leg portion 112 is pressed against the wall portion 103a, 163a and the shoulder portion 118a of the lip 118 is engaged with the peripheral edge of the windshield 105. Thus, the molding body 111 is fixedly supported between the automobile body 101 and the windshield 105.

As shown in FIG. 12, at the first and third molding sections 111a, 111c of molding body 111 which correspond to the roof panel 101a and the arcuate portion C2 and to which the weir member 121 is not fitted, the peripheral edge 113a of the inner covering portion 113 is closely seated on the outside surface of the windshield 105. The outer covering portion 117 is closely seated on the roof panel 101a and the arcuate portion C2 of the automobile body 101.

As shown in FIG. 13, at the second molding section 111b of the molding body 111 which corresponds to the front pillar 101b, the lower surface of the weir body 122 of the weir member 121 is closely seated on the outside surface of the windshield 105, that is, the peripheral edge 113a of the inner covering portion 113 is spaced from the outside surface of the windshield 105. As will be easily understood, the weir portion 122b of the weir body 122 cooperates with the peripheral edge 113a of the inner covering portion 113 and the outside surface of the windshield 105 to form a groove 128 extending along the front pillar 101b. The groove 128 acts as a guide groove to effectively lead rainwater therealong.

Further, the outer covering portion 117 is closely seated on the front pillar 101b of the automobile body 101.

The molding body 111 is manufactured by several machines similar to those shown in FIGS. 5 to 9. Therefore, only parts different from those shown in FIGS. 5 to 9 will be explained.

Figure 14:
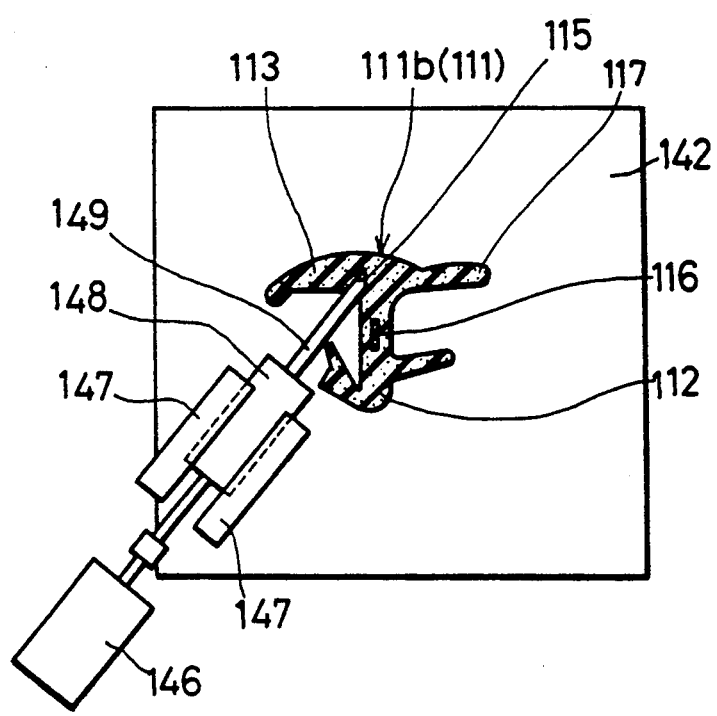
FIG. 14 is an elevational view of a molding die, showing the condition that a grooving tool is upwardly shifted for forming a section of a molding body of the molding which corresponds to a front pillar of the automobile body.

FIG. 14 shows a grooving tool 148 operated by a hydraulic cylinder 146 and provided on the molding die 142. The grooving tool 148 has a grooving blade 149 and is diagonally slidably guided by a pair of guide plate 147 so that the grooving blade 149 is diagonally moved to form the thin groove 115.

Figure 15:
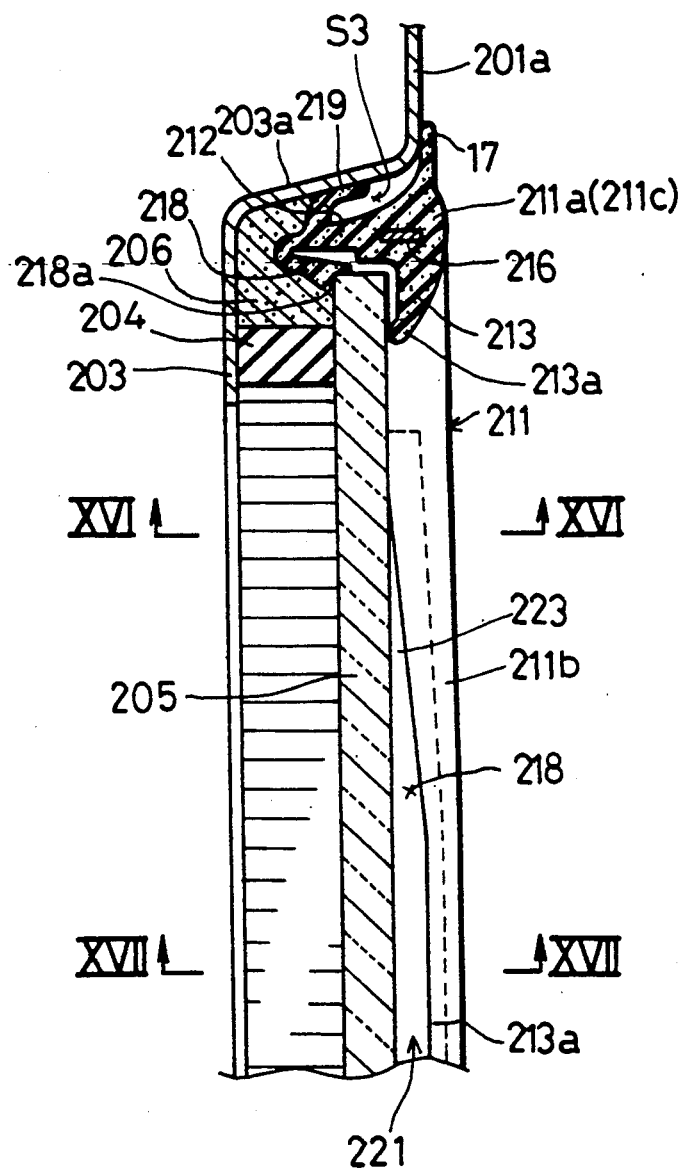
FIG. 15 is a sectional view similar to FIG. 3, showing a molding according to a third embodiment of the present invention.
Figure 16:
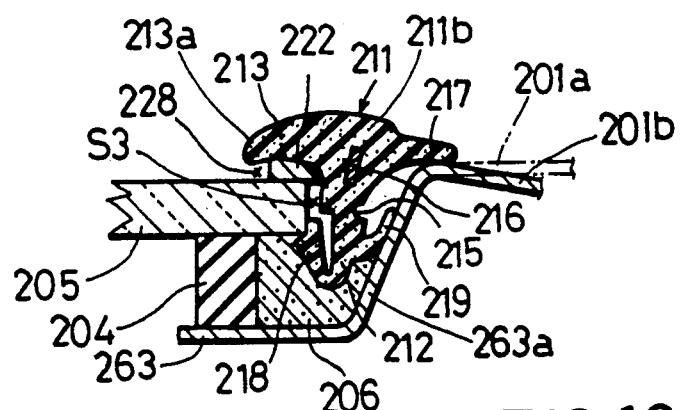
FIG. 16 is a sectional view taken along the line XVI—XVI of FIG. 15.
Figure 17:
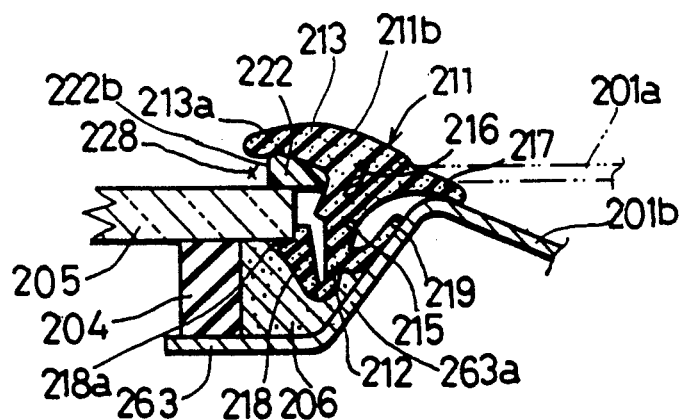
FIG. 17 is a sectional view taken along the line XVII—XVII of FIG. 15.

Referring now to FIGS. 15 to 17, shown therein is a molding 210 according to a third embodiment of the invention. The molding is one different from the moldings according to the first and second embodiments of the invention, that is, the molding 210 is formed so as to be adaptable to an automobile body of which front pillars are modified.

As shown in FIGS. 15 to 17, a roof panel 201a and front pillars 201b (one of which is shown) of an automobile body 201 are interconnected to form arcuate portions (not shown) therebetween. The peripheral edge of the roof panel 201a is inwardly folded to form a slanted wall portion 203a and a flanged portion 203. The peripheral edge of each front pillar 201b is also inwardly folded to form a slanted wall portion 263a and a flanged portion 263 which are integral with the wall portion 203a and the flanged portion 203, respectively. Further, as best shown in FIGS. 16 and 17, the front pillar 201b is gradually inclined toward the lower end thereof, that is, the height of the slanted wall portion 263a is gradually reduced toward the lower end of the front pillar 201b.

A windshield 205 is circumferentially provided with a dam member 204 formed of a rubber or the like and is bonded to the flanged portions 203, 263 with an adhesive 206. A clearance S3 is formed between the edge surface of the windshield 205 and the automobile body 201.

The molding 210 comprises a molding body 211 and a weir member 221.

The molding body 211 is formed of resilient material such as rubber and synthetic resin. The molding body 211 has a substantially T-shaped cross-sectional configuration and includes a first molding section 211a which is positioned along the roof panel 201a, second molding sections 211b (one of which is shown) which are positioned along the front pillars 201b, and third molding sections 211c (one of which is shown) which are positioned along the arcuate portions. The molding body 211 comprises a leg portion 212 which is inserted into the clearance S3, and an inner covering portion 213 and an outer covering portion 217 which are integrally formed with the leg portion 212. The leg portion 212 is integrally formed with an engagement lip 219 outwardly projecting and extending throughout the overall length of the molding body 211. The leg portion 212 is also integrally formed with a lip 218 inwardly projecting and extending throughout the overall length of the molding body 211. The lip 218 has a shoulder portion 218a extending throughout the overall length thereof. The outer surface of the leg portion 212 is substantially centrally formed with thin grooves 215 (one of which is shown). The thin groove 215 extends along only the second molding section 211b. Further, the molding body 211 is longitudinally embedded with a reinforcing bar 216 to prevent expansion and contraction thereof.

The weir member 221 (one of which is shown) are formed of synthetic resin. The weir member 221 comprises a weir body 222 having a length equal substantially to the second section 211b. The weir body 222 has a weir portion 222b which extends substantially throughout the overall length thereof. The weir body 222 is formed with a slanted portion 223 so that the height of the weir portion 222b is gradually reduced toward one end of the weir body 222.

The weir member 221 is formed above is incorporated in the second molding section 211b of the molding body 211 by fitting the upper surface thereof to the lower surface of the inner covering portion 213. Further, the weir member 221 is arranged so that the slanted portion 223 is positioned adjacent to the third molding section 211c. The weir member 221 is fixed to the lower surface of the inner covering portion 213 with an adhesive (not shown).

The molding body 211 incorporated with the weir member 221 is installed to the automobile body 201 by inserting the leg portion 212 of the molding body 211 into the clearance S3, with the molding body 211 bent along the arcuate portion of the automobile body 201. When the leg portion 212 is completely inserted into the clearance S3, the engagement lip 219 of the leg portion 212 is pressed against the wall portion 203a, 263a and the shoulder portion 218a of the lip 218 is engaged with the peripheral edge of the windshield 205. Thus, the molding body 211 is fixedly supported between the automobile body 201 and the windshield 205.

As shown in FIG. 15, at the first and third molding sections 211a, 211c of molding body 211 which correspond to the roof panel 201a and the arcuate portion (not shown) and to which the weir member 221 is not fitted, the peripheral edge 213a of the inner covering portion 213 is closely seated on the outside surface of the windshield 205. The outer covering portion 217 is closely seated on the roof panel 201a and the arcuate portion of the automobile body 201.

As shown in FIGS. 16 and 17, at the second molding section 211b of the molding body 211 which corresponds to the front pillar 201b, the lower surface of the weir body 222 of the weir member 221 is closely seated on the outside surface of the windshield 205 to lift up the inner covering portion 213, thereby to space the peripheral edge 213a of the inner covering portion 213 from the outside surface of the windshield 205. Thus, the peripheral edge 213a of the inner covering portion 213, the weir portion 222b of the weir body 222 and the outside surface of the windshield 205 cooperate to form a groove 228 extending along the front pillar 201b. The groove 228 acts as a guide groove to effectively lead rainwater therealong. Further, as will be easily understood, the leg portion 212 is effectively bent along the thin groove 215 when the inner covering portion 213 is lifted up by the weir member 221. Accordingly, the outer covering portion 217 may be closely seated on the front pillar 201b of the automobile body 201.

The molding body 211 is manufactured by several machines similar to those shown in FIGS. 5 to 9. Therefore, only parts different from those shown in FIGS. 5 to 9 will be explained.

Figure 18:
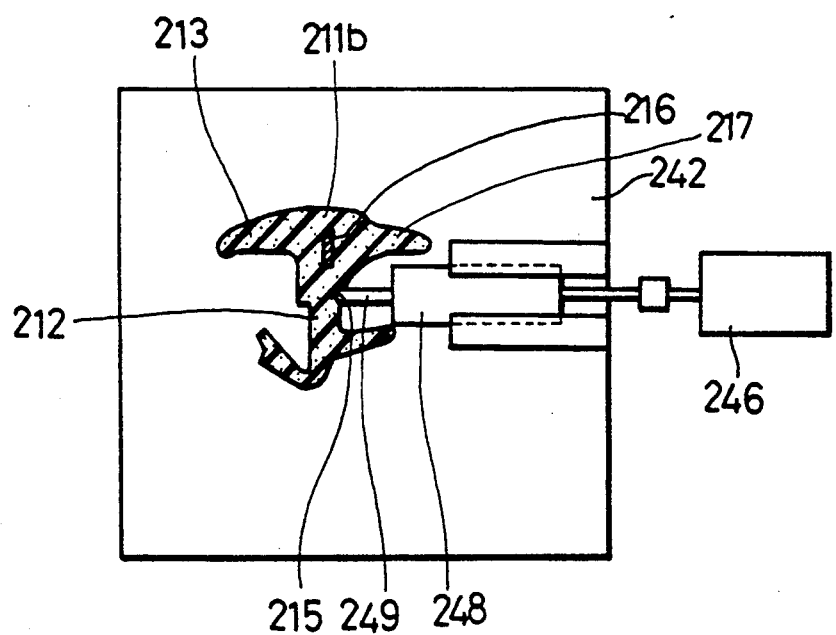
FIG. 18 is an elevational view of a molding die, showing the condition that a grooving tool is upwardly shifted for forming a section of a molding body of the molding which corresponds to a front pillar of an automobile body.
Figure 19:
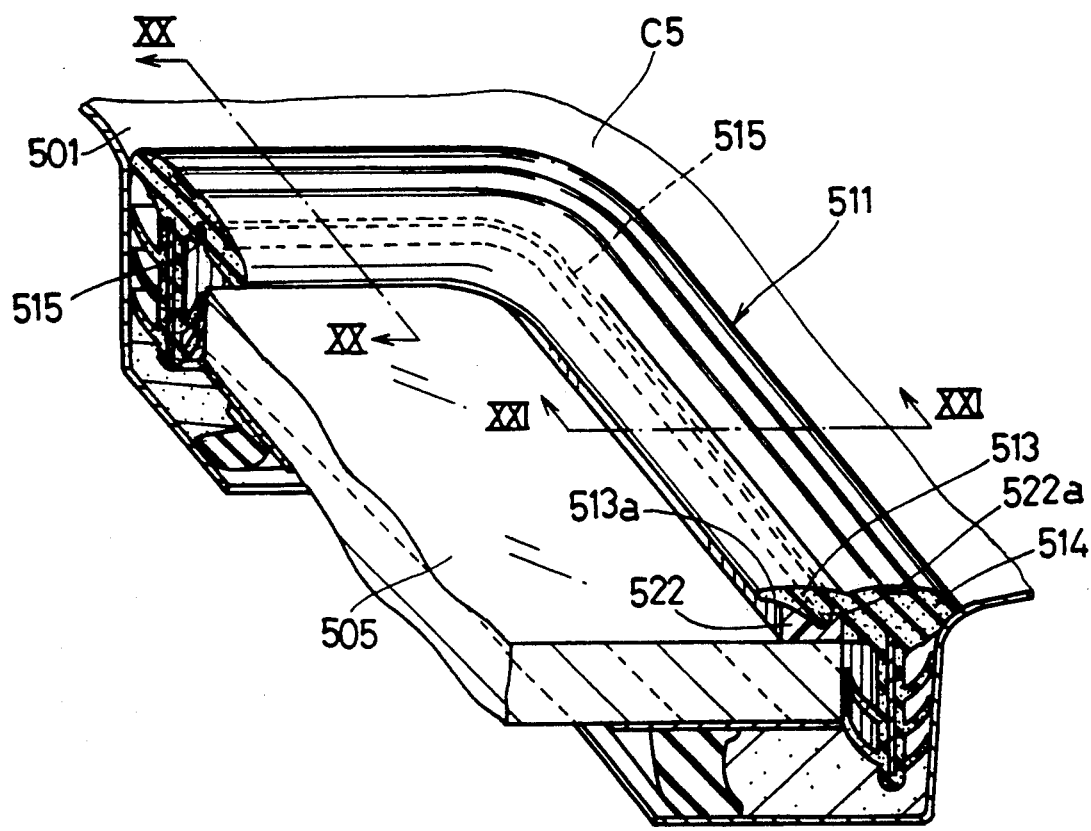
FIG. 19 is a perspective view of a conventional molding and an automobile body to which the molding is installed.
Figure 20:
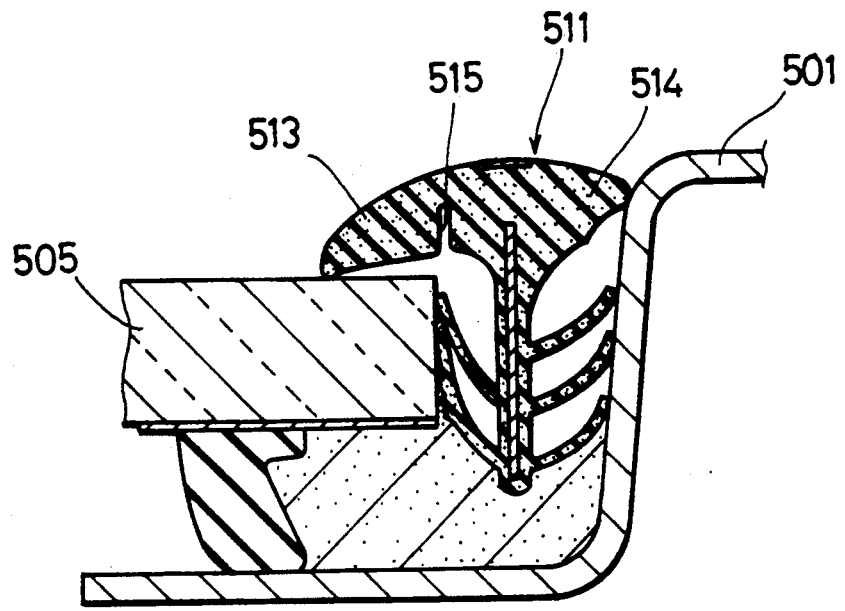
FIG. 20 is a sectional view taken along the line XX—XX of FIG. 19.
Figure 21:
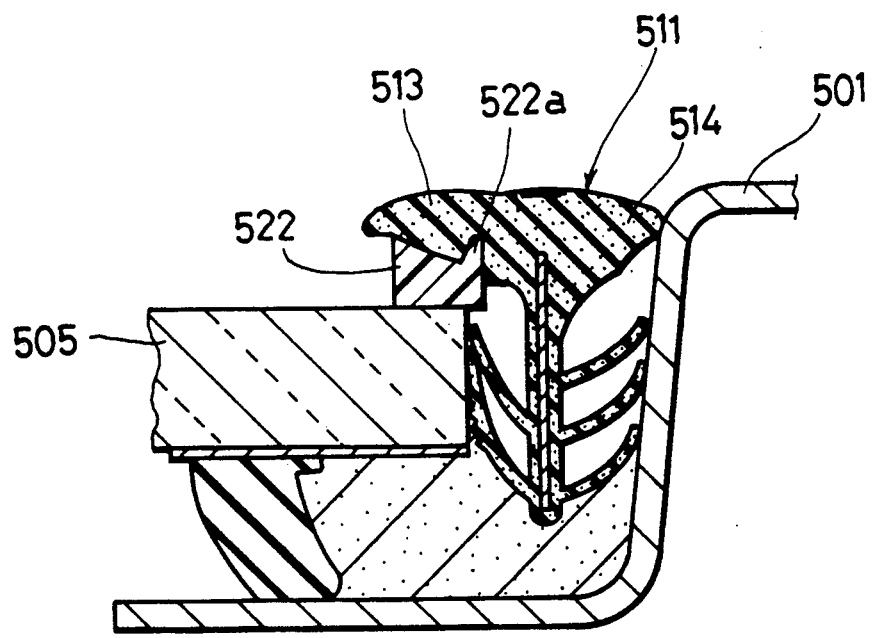
FIG. 21 is a sectional view taken along the line XXI—XXI of FIG. 19.

FIG. 18 shows a grooving tool 248 operated by a hydraulic cylinder 246 and provided on the molding die 242. The grooving tool 248 has a grooving blade 249 and is horizontally slidably guided by a pair of guide plate 247 to that the grooving blade 249 is horizontally moved to form the thin groove 215 on the outer surface of the leg portion 212.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A molding to seal a clearance between an automobile body and a windshield mounted on the automobile body, comprising:
   a molding body having a leg portion and a covering portion integrally provided on and extending along an upper side of said leg portion; and
   a weir member having a weir portion longitudinally fitted along a desired section of said molding body, said desired section corresponding to a front pillar of the automobile body; wherein said molding body is formed with a groove on said covering portion, said groove extending only along said desired section of the molding body, so that a section of said molding body along which said weir member is not fitted, the peripheral edge of said covering portion is seated on the outside surface of the windshield when said molding is positioned along the windshield, and wherein at said section of said molding body along which said weir member is fitted, the peripheral edge of said covering portion is spaced from the outside surface of the windshield to seat the lower edge of said weir portion of said weir member on the outside surface of the windshield when said molding is positioned along the windshield; and
   wherein the leg portion of said molding body if formed with a lip for securing said molding to the automobile body, said lip for engagement with the peripheral edge of the windshield when the molding is positioned along the windshield.

2. The molding as defined in claim 1 further comprising a fastener positioned in the clearance between the automobile body and the windshield for securing said molding to the automobile body, said fastener having a receiving groove into which said leg portion of said molding body is fitted when said molding is positioned along the windshield.

3. The molding unit as defined in claim 1 or 2, wherein said weir member has an engagement projection which is integrally formed with said weir portion and which extends over the entire length thereof, said engagement projection for engagement with said groove and having a width greater than the groove width of said covering portion so that the groove of said covering portion is spread by the engagement projection to uplift the peripheral edge of said covering portion by said engagement.

4. The molding as defined in claim 1 wherein said groove is formed on said leg portion of said molding body.

5. The molding as defined in claim 4 further comprising a fastener positioned in the clearance between the automobile body and the windshield for securing said molding to the automobile body, said fastener having a receiving groove into which said leg portion of said molding body is fitted when said molding is positioned along the windshield.

6. The molding as defined in claim 4, wherein said leg portion of said molding body is formed with a lip for securing said molding to the automobile body, said lip being engaged with the peripheral edge of the windshield when said molding is positioned along the windshield.

7. A process for manufacturing a molding to seal a clearance between an automobile body and a windshield mounted on the automobile body, said molding including a molding body having a leg portion and a covering portion integrally provided on and extending along an upper side of said leg portion, said molding body including a first section formed with a groove longitudinally extending therealong, a second section without such a groove, and a third section formed with a groove longitudinally extending therealong, said first and third sections corresponding to front pillars of the automobile body, comprising the steps of:
   providing a molding die having a molding opening of which the configuration is designed to conform to the sectional configuration of the second section of the molding body;
   providing a grooving member controlled so as to be projected into and withdrawn from said molding opening;
   extruding a molding material from said molding opening of the molding die to form the first section of the molding body over a desired length, said grooving member controlled to be projected;
   extruding a molding material from said molding opening of the molding die to form the second section of the molding body over a desired length, and said grooving member controlled to be withdrawn; and
   extruding a molding material from said molding opening of the molding die to form the third section of the molding body over a desired length, and said grooving member controlled to be projected;
   said steps of forming the first, second and third sections of the molding body being continuously performed.

8. The process as defined in claim 7, wherein the groove is formed on the covering portion of the molding body.

9. The process as defined in claim 7, wherein the groove is formed on the leg portion of the molding body.

* * * * *